United States Patent [19]

Uenaka et al.

[11] Patent Number: 5,038,250
[45] Date of Patent: Aug. 6, 1991

[54] IC CARD

[75] Inventors: Takeshi Uenaka, Hyogo; Jun Ohbuchi, Itami, both of Japan

[73] Assignees: Ryoden Kasei Co. Ltd., Sanda; Mitsubishi Denki Kabushiki Kaisha, Tokyo, both of Japan

[21] Appl. No.: 563,346

[22] Filed: Aug. 7, 1990

[30] Foreign Application Priority Data

Sep. 9, 1989 [JP] Japan .................................. 1-233475

[51] Int. Cl.⁵ .......................... H05K 5/00; G06K 19/18
[52] U.S. Cl. ..................................... 361/395; 361/399; 361/392; 361/394; 235/492
[58] Field of Search ................ 235/492, 495; 361/392, 361/394, 395, 399; 439/137, 140, 141

[56] References Cited

U.S. PATENT DOCUMENTS 4,149,027  4/1979  Asher et al. ........................ 361/399
4,729,741  3/1988  Peng .................................... 439/137
4,868,713  9/1989  Banjo et al. ......................... 235/492

Primary Examiner—Leo P. Picard
Assistant Examiner—Michael W. Phillips
Attorney, Agent, or Firm—Oblon, Spivak, McClelland, Maier & Neustadt

[57] ABSTRACT

An IC card of the present invention comprises a panel having resilient projections and a frame having recesses corresponding to the resilient projections, and the panel is mounted on the frame by engaging the respective resilient projections with the respective recesses. Thus, the panel can be securely attached to the panel.

9 Claims, 8 Drawing Sheets

IC CARD

BACKGROUND OF THE INVENTION

1. Field of the Invention

The present invention relates to an IC card having improved junction strength between a panel and a frame.

2. Description of the Prior Art

FIG. 1 is a perspective view showing an example of a conventional IC card, FIG. 2 is an exploded perspective view of FIG. 1, and FIG. 3 is a sectional view taken along the plane III—III of FIG. 1.

Referring to FIGS. 1 to 3, an IC card 1 consists of a rectangular frame 2, a wiring board 3, and a pair of panels 4 and 5. Electronic parts 6 such as a semiconductor memory or the like are installed on a top and a bottom surface of the wiring board 3, respectively, and a hole 7 is formed at the central part of the wiring board 3.

The frame 2 is made of synthetic resin and has openings 8 on its top and its bottom surface, respectively. A protruding supporter 9 for supporting the wiring board 3 is provided on an inner surface of the frame 2 along a circumferential direction, and an arm 10 having a projection 11 is provided at a central part of the frame 2 along a cross direction. A concavity 12 for supporting the panel 4 is formed on the top surface of the frame 2 along a circumferential direction, while another concavity 13 (see FIG. 3) is formed on the bottom surface of the frame 2 along a circumferential direction, similarly to the concavity 12. A plurality of electrodes 14 for inserting contact pins (not shown) are provided on an end of the frame 2.

Each of the panels 4 and 5 is made of metal, and has a rectangular form.

The IC card 1 is fabricated as follows: First, the projection 11 of the frame 2 is passed through the hole 7 of the wiring board 3, and a peripheral part of the wiring board 3 is put on the convex supporter 9. In that state, a tip end of the projection 11 is crimped while being heated to form a crimping part 11a as shown in FIG. 4, whereby the wiring board 3 with the electronic parts 6 is installed in the frame 2 and the electrodes 14 are electrically connected with the electronic parts 6 through the wiring board 3. Thereafter, the panels 4 and 5 are glued to the concavities 12 and 13 of the frame 2 through adhesive materials 15 such as an adhesive sheet, adhesive bond or the like, respectively, whereby the panels 4 and 5 cover the openings 8 of the frame 2 while containing the wiring board 3 with the electronic parts 6 in the frame 2.

With the above conventional IC card 1, the panels 4 and 5 are attached to the frame 2 only by the adhesive strength of the adhesive materials 15. As a result, a gap may form between the panels 4, 5 and frame 2 owing to the reduction of the adhesive strength with the lapse of time, or the panel 4 or 5 may be partially separated from the frame 2 when the IC card 1 is bent, to thereby deteriorate the quality of the IC card 1.

SUMMARY OF THE INVENTION

An IC card according to the present invention comprises a frame having an opening which is formed on at least one side of a top and a bottom surface thereof, and a plurality of recesses located at a periphery of the opening; an electronic parts contained in the frame; and a panel having a plurality of resilient projections located at a periphery of the panel corresponding to the recesses; the panel being mounted on the frame by engaging the respective resilient projections with the respective recesses and covering the opening.

Accordingly, a principle object of the present invention is to provide an IC card which can improve the performance of the attachment between a panel and a frame.

According to the present invention, since the panel is mounted on the frame by engaging the respective resilient projections of the panel with the respective recesses of the frame, the panel can be securely attached to the frame. And therefore, it can securely prevent the panel from separating from the frame regardless of the lapse of time and the bending operation of the IC card, which eventually makes it possible to improve the quality of the IC card.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
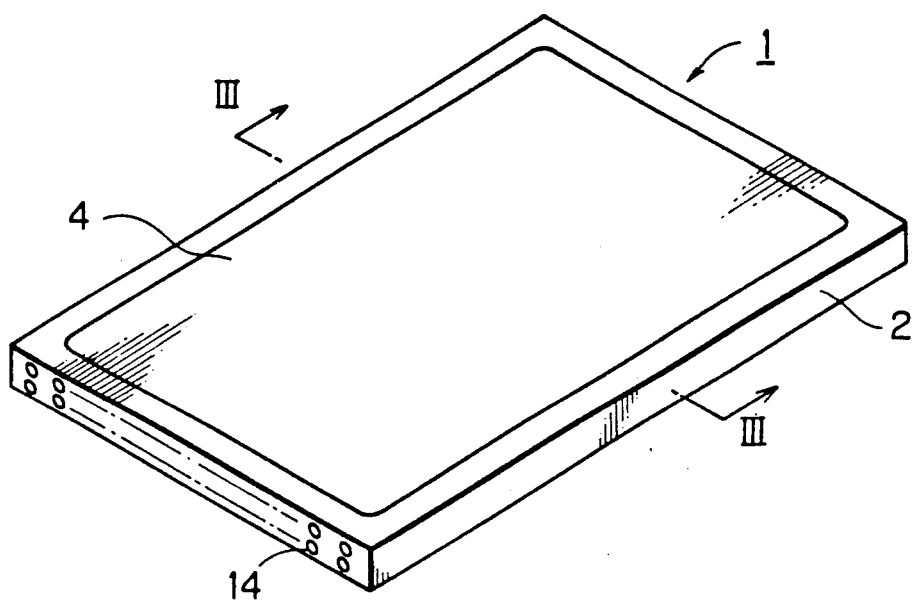
FIG. 1 is a perspective view showing an example of a conventional IC card.
Figure 3:
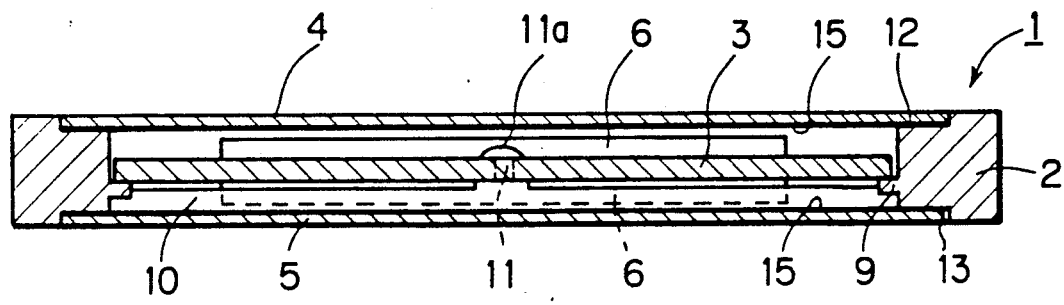
FIG. 3 is a sectional view taken along the plane III-—III of FIG. 1.
Figure 2:
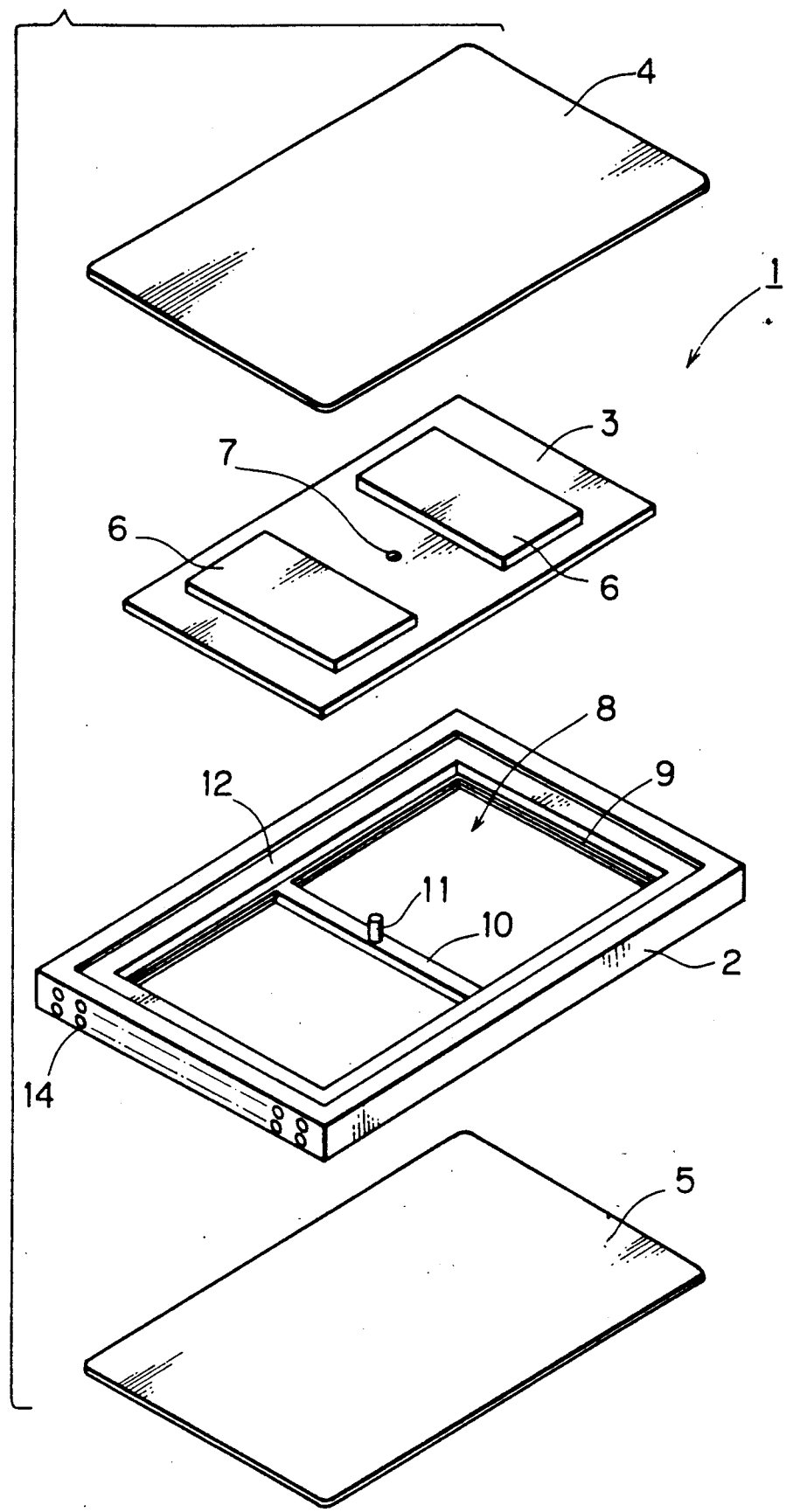
FIG. 2 is an exploded perspective view of FIG. 1.
Figure 4:
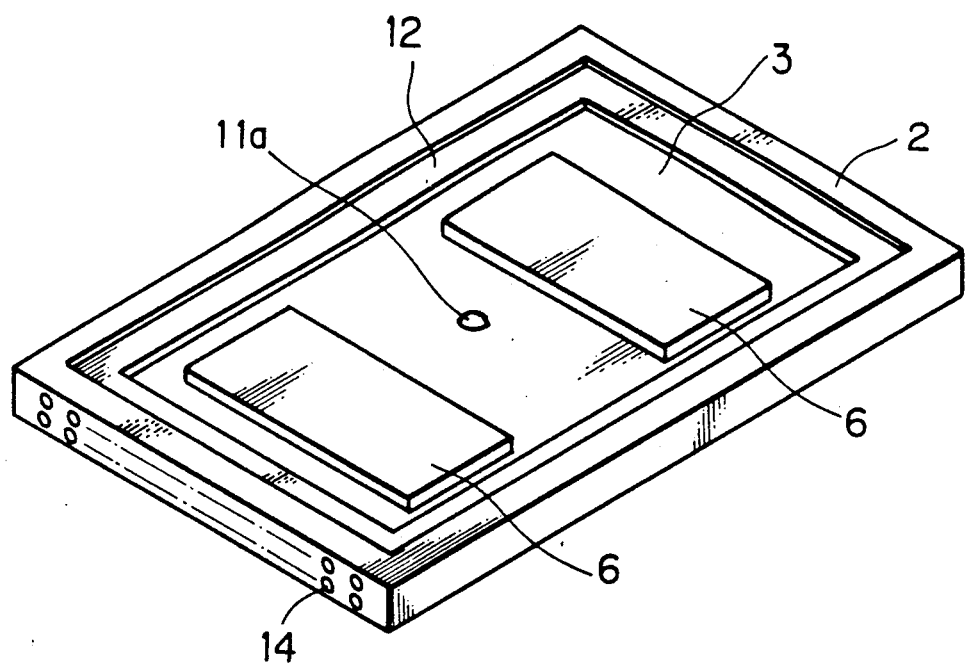
FIG. 4 is a perspective view showing the conventional IC card from which a panel is removed.
Figure 5:
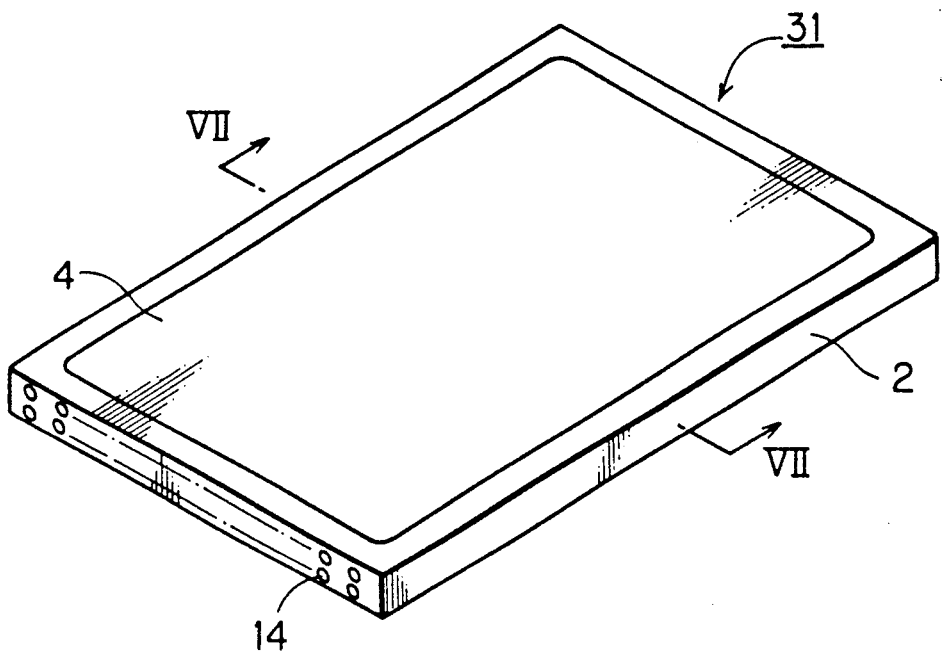
FIG. 5 is a perspective view showing an embodiment of an IC card according to the present invention.
Figure 7:
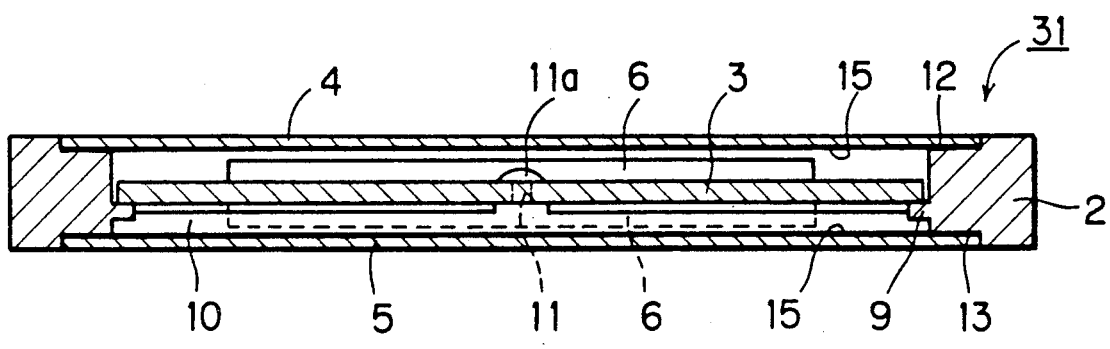
FIG. 7 is a sectional view taken along the plane VII-—VII of FIG. 5.
Figure 6:
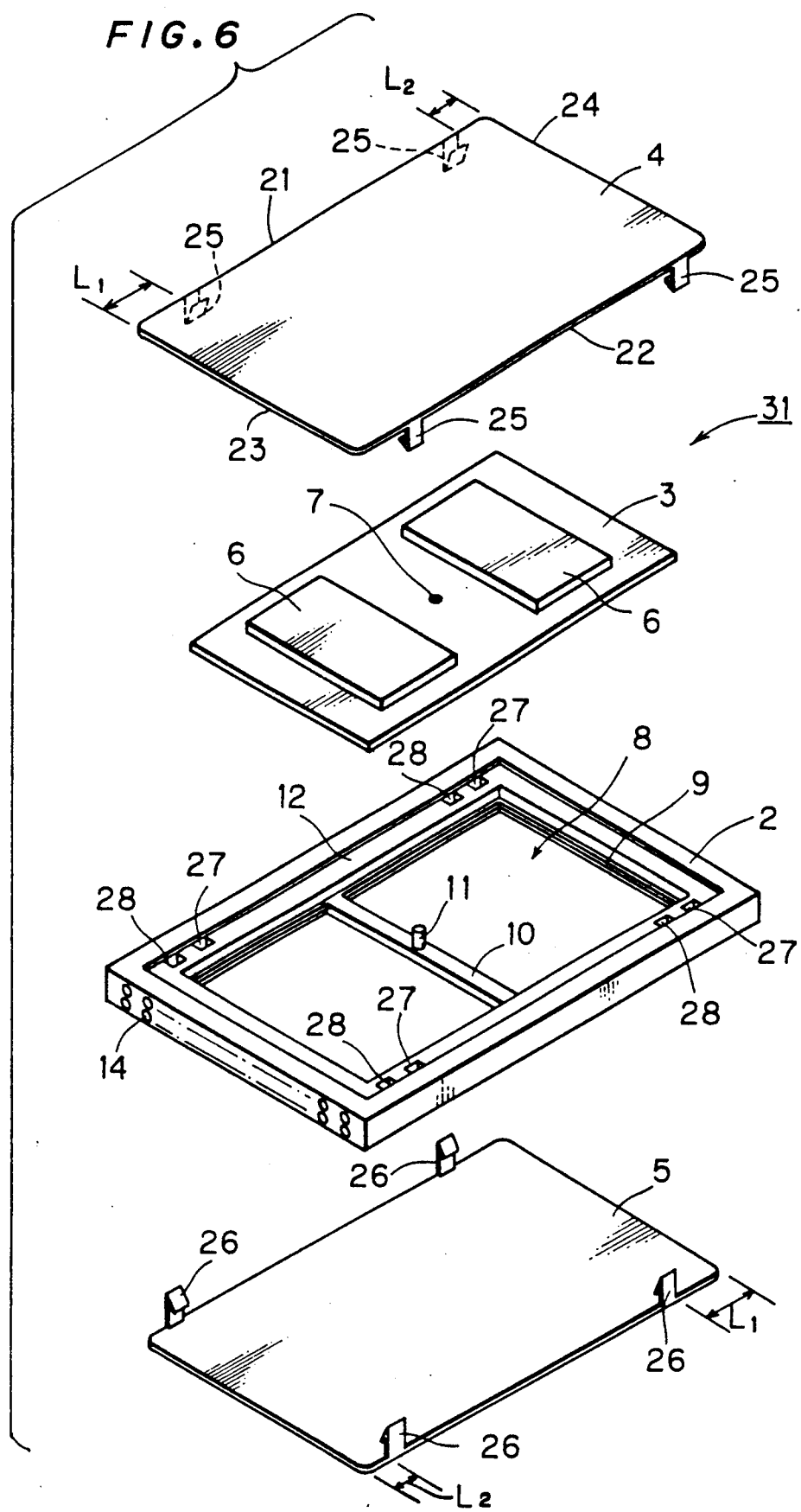
FIG. 6 is an exploded perspective view of FIG. 5.

FIG. 5 is a perspective view showing an embodiment of an IC card according to the present invention, FIG. 6 is an exploded perspective view of FIG. 5, and FIG. 7 is a sectional view taken along the plane VII—VII of FIG. 5.

Referring to FIGS. 5 to 7, each of panels 4 and 5 is made by an elastic member such as a metal plate or the like. The rectangular panel 4 has two opposed long sides 21 and 22 and two opposed short sides 23 and 24, and resilient projections 25 are respectively provided in pairs at each of the long sides 21 and 22.

Figure 8:
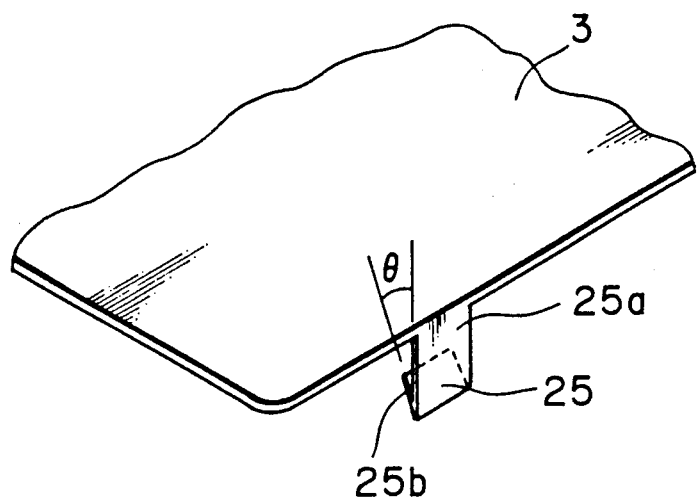
FIG. 8 is a perspective view showing a resilient projection of a panel.

As shown in FIG. 8, each of the resilient projections 25 consists of a protruding piece 25a extending from a back surface of the panel 4 along a vertical direction and a hook 25b formed by folding a top end of the protruding piece 25a at an acute angle θ toward an inner direction of the panel 4.

As shown in FIG. 6, a distance $L_1$ between the one short side 23 and each of the one resilient projections 25 disposed at one end side of the individual long sides 21 and 25 is different from that $L_2$ between the other short side 24 and each of the other resilient projections 25 disposed at the other end side of the individual long sides 21 and 22. The reason will be described later.

The panel 5 has the same construction as the panel 4 but is mounted on the frame 2 in a posture reverse to that of the panel 3. That is, resilient projections 26 similar to the resilient projections 25 of the panel 4 are respectively provided in pairs at each of the long sides of the panel 5, and distances $L_1$ and $L_2$ which represent the position of the resilient projections 26 are determined similarly to those of the panel 4.

The frame 2 has four recesses 27, which are formed on one concavity 12 and which are located at a periphery of one opening 8 corresponding to the resilient projections 25 of the panel 4.

Figure 9:
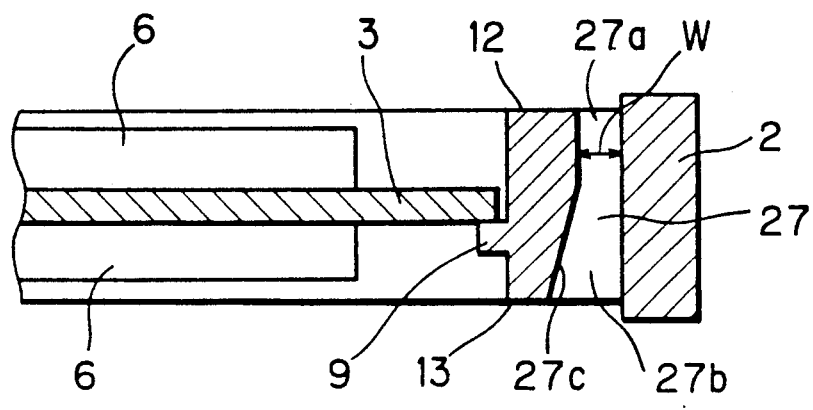
FIG. 9 is a view partially in cross-section, of a portion of the IC card with the panels removed.

As shown in FIG. 9, each of the recesses 27 consists of an entrance space 27a having a fixed narrow width W and a bottom space 27b whose inner wall 27c forms a slope so that a width of the bottom space 27b becomes larger as it goes to a bottom of the bottom space 27b. In this embodiment, the recess 27 is formed as a through hole, but the bottom of recess 27 may be closed.

On the other hand, the frame 2 has the other four recesses 28, which are formed on the other concavity 13 (see FIG. 7) and which are located at a periphery of the other opening 8 corresponding to the resilient projections 26 of the panel 5.

Figure 10:
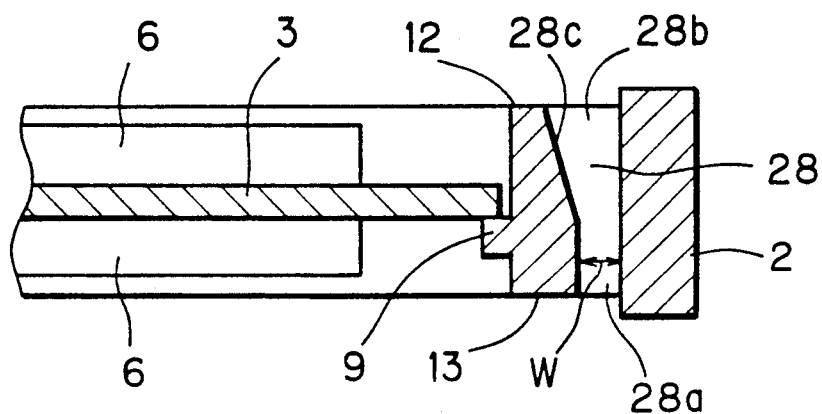
FIG. 10 is a view, partially in cross-section, of another portion of the IC card with the panels removed.

As shown in FIG. 10, each of the recesses 28 has an entrance space 28a, a bottom space 28b and an inner wall 28c similar to the entrance space 27a, the bottom space 27b and the inner wall 27c of the recess 27, respectively, but is formed in a posture reverse to that of the recess 27.

As is apparent from FIG. 6, since the distances $L_1$ and $L_2$ which represent the positions of the resilient projections 25 and 26 of the panels 4 and 5 are different from each other, it is possible to form the recesses 27 and 28 at the mutual different positions of the frame 2.

Since the other structure of the IC card 31 is similar to that of the IC card 1, the same reference numerals are used in the same parts, and hence further explanation thereof will be omitted.

Figure 11:
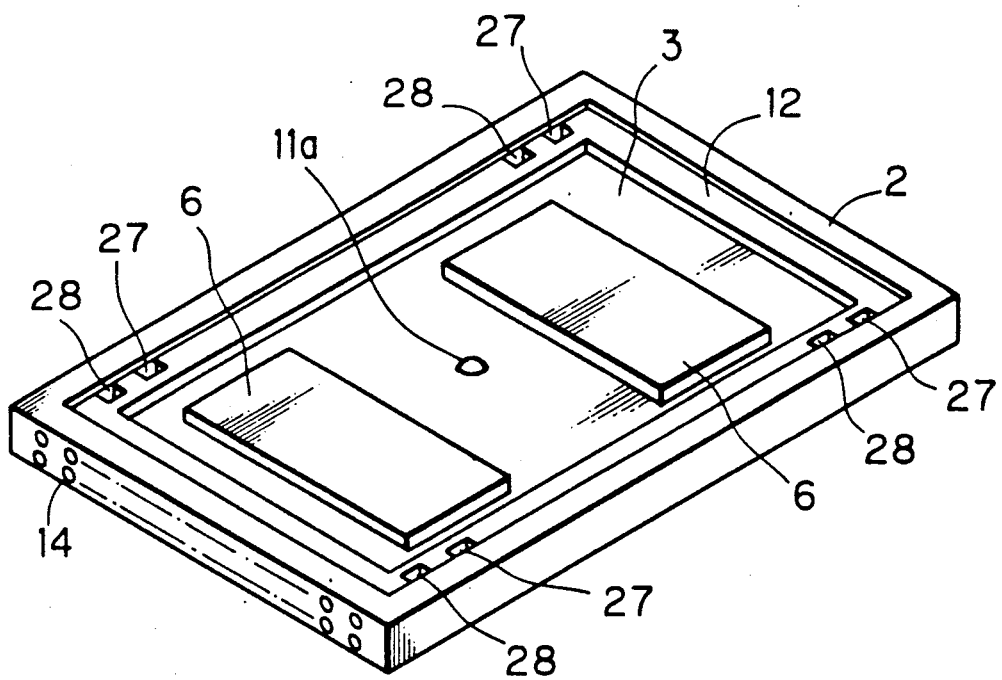
FIG. 11 is a perspective view showing the IC card from which a panel is removed.

The IC card 31 is fabricated as follows: First, similarly to a case of the conventional IC card 1, the projection 11 of the frame 2 is passed through the hole 7 of the wiring board 3, and a peripheral part of the wiring board 3 is put on the protruding supporter 9 of the frame 2. In that state, a tip end of the projection 11 is crimped while being heated to form a crimping part 11a as shown in FIG. 11, whereby the wiring board 3 with the electronic parts 6 is installed in the frame 2 and the electrode 14 are electrically connected with the electronic parts 6 through the wiring board 3.

Figure 12:
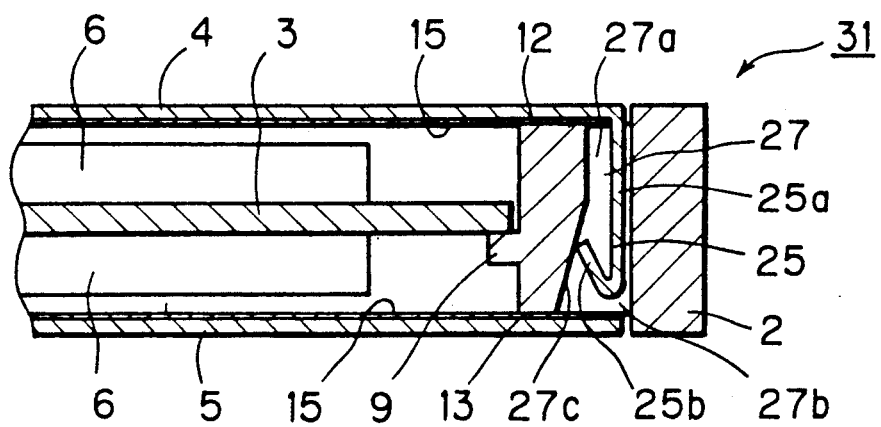
FIG. 12 is a view, partially in cross-section, of a portion of the IC card mounting panels.

Next, an adhesive material 15 (see FIG. 7) such as an adhesive sheet or the like is allocated on the back surface of the panel 4, and thereafter the panel 4 is impressed on the concavity 12 of the frame 2 to insert the resilient projections 25 of the panel 4 into the recesses 27 of the frame 2. As a result, each resilient projection 25 passes through the entrance space 27a of the corresponding recess 27 while elastically deforming the hook 25b thereof toward the protruding piece 25a thereof and then in the bottom space 27b, the hook 25b elastically returns and engages with the inner wall 27c of the bottom space 27b, as shown in FIG. 12. This engagement prevents extracting the resilient projections 25 from the recesses 27. Thus, the panel 4 is jointed to the frame 2 with both the adhesive strength of the adhesive material 15 and the engagement of the resilient projections 25 and the recesses 27.

Figure 13:
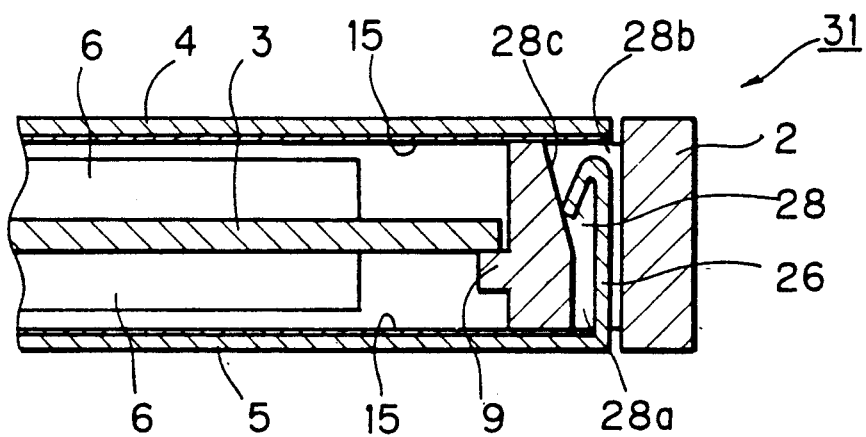
FIG. 13 is a view, partially in cross-section, of another portion of the IC card mounting panels.

Finally, the other panel 5 is jointed to the concavity 13 (see FIG. 7) formed at the bottom surface of the frame 2, similarly to a case of the panel 4. FIG. 13 is a view, partially in cross-section, of a portion of the IC card 31, in which the panel 5 is jointed to the frame 2 with both the adhesive strength of the adhesive material 15 and the engagement of the resilient projections 26 and the recesses 28.

According to the IC card 31, the panels 4 and 5 are jointed to the frame 2 with the engagement of the resilient projections 25, 26 and the recesses 27, 28 in addition to the adhesion by the adhesive materials 15. Consequently, even if the adhesive strength of the adhesive materials 15 has been deteriorated with the lapse of time, or even if the IC card 31 has been forcibly bent, the panels 4 and 5 maintain to securely joint to the frame 2 by the engagement of the resilient projections 25, 26 and the recesses 27, 28.

In the above embodiment, although the panels 4 and 5 have been jointed to the frame 2 with both the adhesive strength of the adhesive materials 15 and the engagement of the resilient projections 25, 26 and the recesses 27, 28, the adhesive materials 15 may be omitted according to circumstances.

In the above embodiment, although the resilient projections 25 (26) have been respectively provided in pairs at each of the long sides 21 and 22 of the panel 4 (5), three or more resilient projections 25 (26) may be respectively provided at each of the long sides 21 and 22 of the panel 4 (5). Furthermore, the resilient projections 25 (26) may be provided at two opposed short sides 23 and 24 of the panel 4 (5) instead of two opposed long sides 21 and 22 of the panel 4 (5), or may be provided at both of two opposed long sides 21 and 22 and two opposed short sides 23 and 24 of the panel 4 (5).

In the above embodiment, although the panels 4 and 5, the frame 2 and the wiring board 3 have each been in the shape of a rectangle respectively, they may be a quadrate respectively.

In the above embodiment, although the frame 2 has two openings 8 which are respectively formed on the top and the bottom surface thereof and two panels 4 and 5 are mounted on the both surfaces of the frame 2, the frame 2 may have a single opening 8 which is formed on one side of the top and the bottom surface thereof and a single panel 4 or 5 may be mounted on the surface having the opening of the frame 2.

Besides, the wiring board 3 may be installed within the frame 2 by a different way from that described above.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An IC card comprising:
   a frame having an opening which is formed on at least one side of a top and a bottom surface thereof, and a plurality of recesses located at top at a periphery of said opening;

at least one electronic part contained in said frame;

a panel having a plurality of resilient projections located at a periphery of said panel corresponding to said recesses;

said panel being mounted on said frame by engaging said respective resilient projections with said respective recesses and covering said opening; wherein each of said resilient projections includes a protruding piece extending from a back surface of said panel and having a hook formed at an end thereof; and wherein each of said recesses includes an entrance space having a fixed narrow width and a bottom space having a wider width than the fixed narrow width of said entrance space.

2. An IC card according to claim 1, wherein: the hook at the end of said resilient projections is formed by folding a top end of said protruding piece toward an inner direction of said panel, while each of said recesses includes an inner wall forming a slope so that a width of said bottom space becomes larger as it goes from said entrance space to a bottom of said bottom space, each of said resilient projections passing through each of said entrance spaces while elastically deforming each of said hooks towards said protruding piece each of said hooks elastically returned with returning and engaging with each of said inner walls of said bottom spaces.

3. An IC card of claim 1 or 2, wherein said panel is a rectangle, and said resilient projections are provided at two opposed sides of said panel, respectively.

4. An IC card of claim 1 or 2, wherein said panel is a rectangle, and said resilient projections are provided at all four sides of said panel, respectively.

5. An IC card of claim 3, wherein said panel is a rectangle having two opposed long sides and two opposed short sides, and said resilient projections are respectively provided in pairs at each of said two opposed long sides.

6. An IC card of claim 5, wherein said frame has two openings which are respectively formed on said top and said bottom surface thereof, said card has two panels, one of which covers said one opening and the other of which covers the other opening, and said two panels have the same construction but are mounted on said frame in a posture reverse to each other, in each of which a distance between said one short side and each of said one resilient projections disposed at one end side of said individual long sides is different from that between the other short side and each of the other resilient projections disposed at the other end side of said individual long sides, in order to prevent said resilient projections of said one panel and said resilient projections of the other panel from interfering with each other.

7. An IC card of claim 1 or 2, further comprising an adhesive material disposed on the back surface of said panel, said panel being glued to said frame through said adhesive material.

8. An IC card of claim 1 or 2, wherein said electronic parts is installed in said frame through a wiring board, and a plurality electrodes are provided on an end surface of said frame, said electrodes being electrically connected with said electronic parts through said wiring board.

9. An IC card of claim 1 or 2, wherein said panel is made of metal while said frame is made of resin.

* * * * *